(12) United States Patent
Baldwin

(10) Patent No.: US 9,390,032 B1
(45) Date of Patent: Jul. 12, 2016

(54) GESTURE CAMERA CONFIGURATIONS

(75) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 107 days.

(21) Appl. No.: 13/535,126

(22) Filed: Jun. 27, 2012

(51) Int. Cl.
*G06F 13/00* (2006.01)
*H04N 5/235* (2006.01)

(52) U.S. Cl.
CPC .............. *G06F 13/00* (2013.01); *H04N 5/235* (2013.01)

(58) Field of Classification Search
CPC ......... G06F 3/017; G06F 1/3234; G06F 3/00; G06F 13/00; G06K 9/00; G06K 9/00228; G06K 9/00597; G06K 9/3216; G07C 9/00158; H05B 37/02; H04N 5/235
See application file for complete search history.

(56) References Cited

U.S. PATENT DOCUMENTS

| | | | | |
|---|---|---|---|---|
| 6,714,665 | B1 * | 3/2004 | Hanna et al. ................... | 382/117 |
| 7,627,142 | B2 * | 12/2009 | Kurzweil et al. .............. | 382/114 |
| 8,659,237 | B2 * | 2/2014 | Archenhold ................... | 315/297 |
| 2007/0071321 | A1 * | 3/2007 | Ota ............................... | 382/181 |
| 2009/0139778 | A1 * | 6/2009 | Butler et al. ................ | 178/18.03 |
| 2009/0153655 | A1 * | 6/2009 | Ike et al. ........................... | 348/77 |
| 2010/0074471 | A1 * | 3/2010 | Kurzweil et al. .............. | 382/103 |
| 2011/0286676 | A1 * | 11/2011 | El Dokor ....................... | 382/225 |
| 2012/0062558 | A1 * | 3/2012 | Lee et al. ....................... | 345/419 |
| 2012/0110218 | A1 * | 5/2012 | Josefsson et al. ............... | 710/18 |
| 2012/0113241 | A1 * | 5/2012 | Sundaresan et al. ............ | 348/77 |
| 2012/0242698 | A1 * | 9/2012 | Haddick et al. ................ | 345/633 |
| 2012/0306811 | A1 * | 12/2012 | Farmer ................ | G06F 3/04883 345/174 |
| 2013/0142387 | A1 * | 6/2013 | Gomez et al. .................. | 382/103 |
| 2013/0156296 | A1 * | 6/2013 | El Dokor ....................... | 382/154 |

* cited by examiner

*Primary Examiner* — Claire X Pappas
*Assistant Examiner* — Richard Hong
(74) *Attorney, Agent, or Firm* — Polsinelli LLP

(57) ABSTRACT

The amount of power and processing capacity needed to process gesture input for a computing device can be reduced by utilizing one or more relatively low power, low resolution gesture sensors. The gesture sensors can have relatively large pixels, which provide enhanced sensitivity in low light situations. Further, the low resolution and high frame rates of the gesture sensors can enable relatively low bandwidth buses to be used, rather than dedicated image buses. These low bandwidth buses can conserve a significant amount of power, and can provide the image data from the gesture sensors to low power PIC-class microprocessors, or other such components, which can analyze image data and make basic gesture determinations without having to wake up an application processor or send data over a main bus, which can further reduce power consumption.

26 Claims, 5 Drawing Sheets

GESTURE CAMERA CONFIGURATIONS

BACKGROUND

People are increasingly interacting with computers and other electronic devices in new and interesting ways. One such interaction approach involves making a detectable motion or gesture with respect to a device, which can be detected using a camera or other such element. While image recognition can be used with existing cameras to determine various types of motion, the amount of processing needed to analyze full color, high resolution images is generally very high. This can be particularly problematic for portable devices that might have limited processing capability and/or limited battery life, which can be significantly drained by intensive image processing. Some devices utilize basic gesture detectors, but these detectors typically are very limited in capacity and only are able to detect simple motions such as up-and-down, right-or-left, and in-and-out. These detectors are not able to handle more complex gestures, such as holding up a certain number of fingers or pinching two fingers together.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to interacting with an electronic environment. In particular, various approaches enable gesture- and/or motion-based input to be provided to an electronic device. Such approaches enable relatively complex gestures to be interpreted with lower cost and lower power consumption than conventional approaches. In at least one embodiment, one or more gesture sensors can be utilized that have a form factor similar to that of a conventional camera element, such that any of a number of available, low cost lenses and other such elements can be utilized. These gesture sensors also can have a relatively small number of pixels, such as on the order of about 1,000 pixels, which enables each pixel to be relatively large with respect to conventional imaging elements. The larger pixels enable the gesture sensor to be more sensitive than conventional cameras in low light situations. Further, the small number of pixels means that a lower bandwidth bus, such as a general purpose, bi-directional serial bus, can be used to transfer image data than is used for conventional cameras. The relatively small number of pixels also simplifies the implementation of a global shutter in at least some embodiments. Such implementations provide various advantages, including reduced power consumption and lower processing requirements while still providing sufficient resolution for gesture recognition. Further, the ability to provide a virtual or global shutter for the gesture sensor enables each pixel to capture information at substantially the same time, with substantially the same exposure time, eliminating most blur issues found with rolling shutter elements. The shutter speed also can be adjusted as necessary due to a number of factors, such as device-based illumination and ambient light, in order to effectively freeze motion and provide for enhanced gesture determination.

Various other applications, processes and uses are presented below with respect to the various embodiments.

Figure 1:
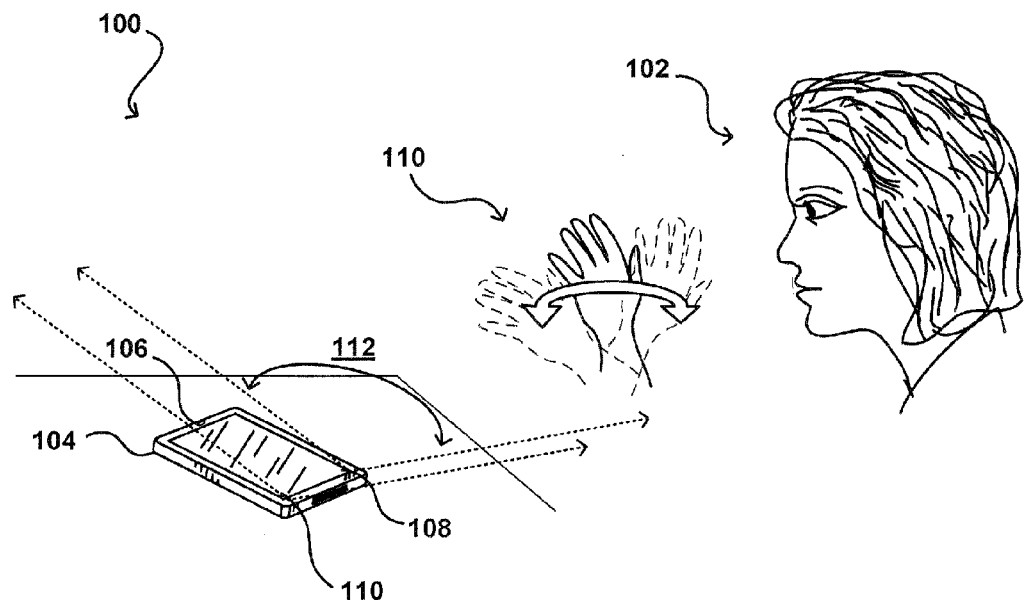
FIG. 1 illustrates an example environment in which various aspects can be implemented in accordance with various embodiments.

FIG. 1 illustrates an example situation 100 wherein a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one high resolution camera 106 operable to perform functions such as image and/or video capture for purposes such as self-portrait capture or video chat. The device also includes a pair of gesture sensors 108, 110 operable to capture lower resolution images for purposes such as gesture detection. The camera, gesture sensors, and any other such image capture elements on the device may be, for example, a camera, a charge-coupled device (CCD), a motion detection sensor, or an infrared sensor, or can utilize another appropriate image-capturing technology.

In this example, the user 102 is performing a selected motion or gesture using the user's hand 110. The motion can be one of a set of motions or gestures recognized by the device to correspond to a particular input or action. If the motion is performed within a viewable area or angular range 112 of the pair of gesture sensors 108, 110 on the device, the sensors can capture one or more images including the motion, such that the device can analyze the images using at least one image analysis or feature recognition algorithm and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference. If a motion or gesture is detected that matches a known motion or gesture, a determination can be made of a corresponding input to provide to software executing on the computing device. This can include, for example, sending an input to a user interface application executing on the device, whereby a user can provide input to the user interface application by performing one or more gestures within a field of view of one or more gesture cameras or other such elements.

As discussed above, however, analyzing full color, high resolution images from one or more cameras can be very processor, resource, and power intensive, particularly for mobile devices, such that it is not practical to continually operate conventional components for gesture detection. Conventional complementary metal oxide semiconductor (CMOS) devices consume less power than other conventional camera sensors, such as charge coupled device (CCD) cameras, and thus can be desirable to use as a gesture sensor. While relatively low resolution CMOS cameras such as CMOS QVGA cameras (i.e., with 320×240 pixels, for example) can be much less processor-intensive than other such cameras, these CMOS cameras typically are rolling shutter devices, which as discussed above are poor at detecting motion. Each pixel is exposed and read at a slightly different time, resulting in apparent distortion when the subject and the camera are in relative motion during the exposure. CMOS devices are advantageous, however, as they have a relatively standard form factor with many relatively inexpensive and readily available components, such as lenses and other elements developed for webcams, cell phone, notebook computers, and the like. Further, CMOS cameras typically integrate the necessary readout circuitry and have a relatively small amount of external circuitry requirements, which can be particularly advantageous for small portable computing devices, and the components can be obtained relatively cheaply, at least with respect to other types of camera sensors.

Approaches in accordance with various embodiments can take advantage of various aspects of CMOS camera technology, or other such imaging technology, to provide a relatively low power but highly accurate gesture sensor that can utilize existing design and implementation aspects to provide a sensible solution to gesture detection. Such a gesture sensor can be used in addition to a conventional camera, in at least some embodiments, which can enable a user to activate or control aspects of the computing device through gesture or movement input, without utilizing a significant amount of resources on the device. A single gesture sensor can be used for basic gestures, or two or more sensors can be used for complex and/or three-dimensional gestures, among other such options.

Figure 2:
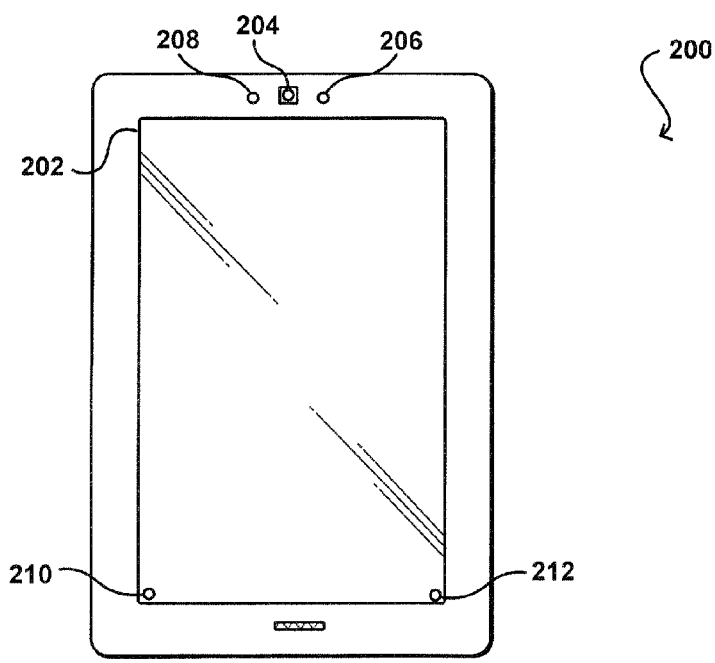
FIG. 2 illustrates an example computing device that can be used in accordance with various embodiments.

FIG. 2 illustrates an example computing device 200 that can be used in accordance with various embodiments. In this example, the device has a conventional digital camera 204 on the same side of the device as a display element 202, enabling the device to capture image information about a user of the device during typical operation where the user is at least partially in front of the display element. In addition, there are two gesture sensors 210, 212 positioned on the same side of the device that can be used to determine gesture input from the user when at relatively the same location. It should be understood that there can be additional cameras, gesture sensors, or other such elements on the same or other sides or locations of the device as well within the scope of the various embodiments, such as may enable gesture or image input from any desired direction or location with respect to the device. A camera and at least one gesture sensor can be used together advantageously in various situations, such as where a device wants to enable gesture recognition at relatively low power over an extended period of time using the gesture sensor(s), and perform facial recognition or other processor and power intensive processes at specific times using the conventional, higher resolution camera.

This example device also illustrates additional elements that can be used as discussed later herein, including a light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. Various other elements and combinations of elements can be used as well within the scope of the various embodiments as should be apparent in light of the teachings and suggestions contained herein.

As discussed, conventional low-cost CMOS devices typically do not have a true electronic shutter, and thus suffer from the rolling shutter effect. While this is generally accepted in order to provide high resolution images in a relatively small package, gesture detection does not require high resolution images for sufficient accuracy. For example, a relatively low resolution camera can determine that a person is moving his or her hand left to right, even if the resolution is too low to determine the identity whether the hand belongs to a man or a woman.

Figure 3A:
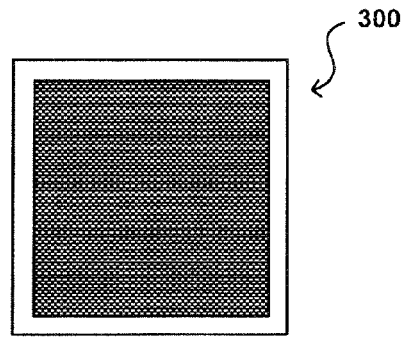
FIGS. 3(a) and 3(b) illustrate a conventional camera sensor and a gesture sensor having a similar form factor that can be used in accordance with various embodiments.
Figure 3B:
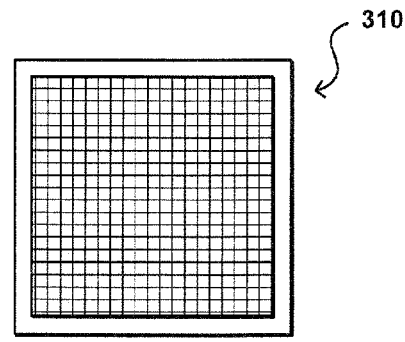

Accordingly, an approach that can be used in accordance with various embodiments discussed herein is to utilize aspects of a conventional camera, such as CMOS camera. An example of a CMOS camera sensor 300 is illustrated in FIG. 3(a), although it should be understood that the illustrated grid is merely representative of the pixels of the sensor and that there can be hundreds to thousands of pixels or more along each side of the sensor. Further, although the sensors shown are essentially square it should be understood that other shapes or orientations can be used as well, such as may include rectangular or hexagonal active areas. FIG. 3(b) illustrates an example of a gesture sensor 310 that can be used in accordance with various embodiments. As can be seen, the basic form factor and components can be similar to, or the same as, for the conventional camera sensor 300. In this example, however, there are fewer pixels representing a lower resolution device. Because the form factor is the same, this results in larger pixel size (or in some cases a larger separation between pixels, etc.).

In at least some embodiments, a gesture sensor can have a resolution on the order of about 32×32 or 40×40 pixels. Other formats may have, but are not limited to, a number of pixels on the order of about 1,000 pixels. It should be understood that smaller form factor sensors with such a number of pixels can be used as well, although it can be advantageous to keep the pixels relatively large, as discussed elsewhere herein. The pixel size can be a combination of the sensor size and number of pixels, among other such factors.

Figure 4A:
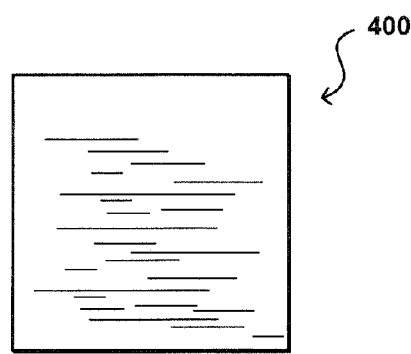
FIGS. 4(a), (b), (c), and (d) illustrate examples of images of a hand in motion that can be captured in accordance with various embodiments.

An advantage to having a relatively smaller number of larger pixels is that global shuttering can be incorporated with the pixels without a need to increase the size of the die containing the sensor. As discussed, a small die size can be important for factors such as device cost (which scales with die area), device size (which is driven by die area), and the associated lenses and costs (which is driven at least in part by the active area, which is a principle determinant of the die area). It also can be easier to extend the angular field of view of various lens elements (i.e., beyond 60 degrees diagonal) for smaller, low resolution active areas. Further, the ability to use a global shutter enables all pixels to be read at essentially the same time, and enables the device to control how much time the pixels are exposed to, or otherwise able to capture, incident light. Such an approach not only provides significant improvement in capturing items in motion, but also can provide significant power savings in many examples. As an example, FIG. 4(a) illustrates in a diagrammatic fashion an example 400 of the type of problem encountered by a rolling shutter camera when trying to capture a waving hand. As can be seen, there is a significant amount of blur or distortion that can prevent a determination of the precise, or even approximate, location of the hand in this frame for comparison against subsequent and/or preceding frames.

Figure 4B:
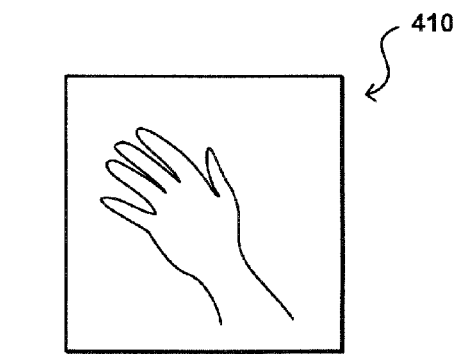

The use of a global shutter enables the exposed pixels to capture charge at substantially the same time. Thus, the sensor can have a very fast effective shutter speed, limited only (primarily) by the speed at which the pixels can be exposed and then drained. The sensor thus can capture images of objects, even when those objects are in motion, with very little blur. For example, FIG. 4(b) illustrates an example of an image 410 that can be captured of a hand while the hand is engaged in a waving motion. Due at least in part to the fast shutter speed and the near simultaneous reading of the pixels, the approximate location of the hand at the time of capture of the image can readily be determined.

The use of a global shutter also enables a more effective use of an illuminator such as an IR LED. The LED can be pulsed at very high current for a very short but high-intensity luminous output. The luminous output is integrated simultaneously by the globally shuttered pixels, stored, and then read out serial. This can be more efficient than rolling shutter imagers that expose the pixels sequentially and require that the illuminator be on for the duration of the readout time, thus reducing the peak current that the LED illuminator can be operated at as there is a limit on the current-time product for thermal-effect reasons. Use of the global shutter also can improve control of the ratio between admitted ambient light and admitted illuminant lighting for difficult lighting conditions and to emphasize near-field objects over a distant background.

Figure 4C:
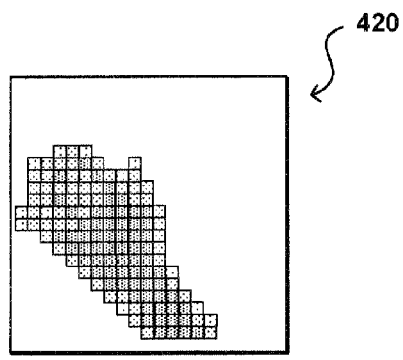
Figure 4D:
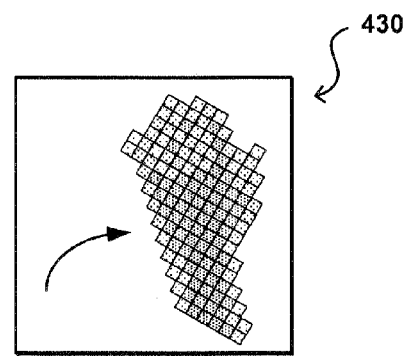

As discussed, the ability to recognize such gestures will not often require high resolution image capture. For example, consider the image 420 illustrated in FIG. 4(c). This image illustrates the fact that even a very low resolution image can be used to determine gesture input. In FIG. 4(c), the device might not be able to recognize whether the hand is a man's hand or a woman's hand, but can identify the basic shape and location of the hand in the image such that changes in position due to waving or other such motions, as illustrated in image 430 of FIG. 4(d), can quickly be identified with sufficient precision. Even at this low resolution, the device likely would be able to tell whether the user was moving an individual finger or performing another such action.

In at least some embodiments, however, it can be desirable to further reduce the amount of power consumption and/or processing that must be performed by the device. For example, it might be undesirable to have to capture image information continually and/or analyze that information to attempt to determine whether a user is providing gesture input, particularly when there has been no input for at least a minimum period of time.

Accordingly, systems and methods in accordance with various embodiments can utilize low power, low resolution gesture sensors to determine whether to activate various processors, cameras, or other components of the device. For example, a device might require that a user perform a specific gesture to "wake up" the device or otherwise cause the device to prepare for gesture-based input. In at least some embodiments, this "wake up" motion can be a very simple but easily detectable motion, such as waving the user's hand and arm back and forth, or swiping the user's hand from right to left across the user's body. Such simple motions can be relatively easy to detect using the low resolution, low power gesture sensors. In at least some embodiments, the detection of a wake-up gesture can cause a command to be sent to a central processor of the device to take the device out of a mode, such as sleep mode or another low power mode, and in at least some embodiments activate a higher resolution camera for a higher frame rate and/or higher resolution capture mode.

Another advantage of being able to treat the pixels as having electronic shutters is that there are at least some instances where it can be desirable to separate one or more features, such as a user's hand and/or fingers, from the background. Even at various resolutions, it can be relatively processor intensive to attempt to identify a particular feature in the image and follow this through subsequent images. A less processor-intensive approach would be to separate the hand from the background before analysis.

In at least some embodiments, a light emitting diode (LED) or other source of illumination can be triggered to produce illumination over a short period of time in which the pixels of the gesture sensor are going to be exposed. With a sufficiently fast virtual shutter, the LED will illuminate a feature close to the device much more than other elements further away, such that a background portion of the image can be substantially dark (or otherwise, depending on the implementation). Such an image is much easier to analyze, as the hand has been separated out from the background automatically, and thus can be easier to track through the various images. A light sensor can be used in at least some embodiments to determine when illumination is needed due at least in part to lighting concerns.

Another advantage to using low resolution gesture sensors is that the amount of image data that must be transferred is significantly less than for conventional cameras. Accordingly, a lower bandwidth bus can be used for the gesture sensors in at least some embodiments than is used for conventional cameras. For example, a conventional camera typically uses a bus such as a CIS (CMOS Image Sensor) or MIPI (Mobile Industry Processor Interface) bus to transfer pixel data from the camera to the host computer, application processor, central processing unit, etc. A low power, low resolution gesture sensor, on the other hand, can have a number of pixels on the order of about 1024 pixels, or in the range of about 256 to 76,000 pixels. Further, the gesture sensor can have frame rates for gesture interpretation on the order of about 60 frames per second, with ranges from about 15 frames per second to about 240 frames per second in various embodiments. These combinations of resolutions and frame rates do not require a dedicated pixel bus such as a MIPI bus, but can instead utilize much lower power buses, such as I$^2$C (Inter-Integrated Circuit), SPI (Serial Peripheral Interface), and SD (secure digital) buses, among other general purpose, bi-directional serial buses and other such buses. These buses are typically not thought of as imaging buses, but are adequate for transferring the gesture sensor data for analysis, and more importantly can significantly reduce the power consumption for not only the camera data but also for the entire system, such as the bus interface on the host side. Furthermore, by using a common serial bus, processors that do not normally connect to cameras and do not have MIPI buses can be connected to these low-resolution gesture sensor cameras. For example, a PIC-class processor or microcontroller (originally a "peripheral interface controller") is often used in mobile computing devices as a supervisor processor to monitor components such as power switches. A PIC processor can be connected over an I$^2$C bus to a gesture camera, and the PIC processor can interpret the image data captured by the gesture sensors to recognize gestures such as "wake up" gestures.

Some processing can be integrated on-die with the gesture sensor. One example approach utilizes a low power, autonomous wake-up mode implemented on the sensor with comparators that can recognize a changing scene, at least beyond preset values, and can assert a wake-up line that would wake up a host processor to start receiving images. Such changes can include spatial changes and temporal (i.e., frame-to-frame) changes.

Figure 5:
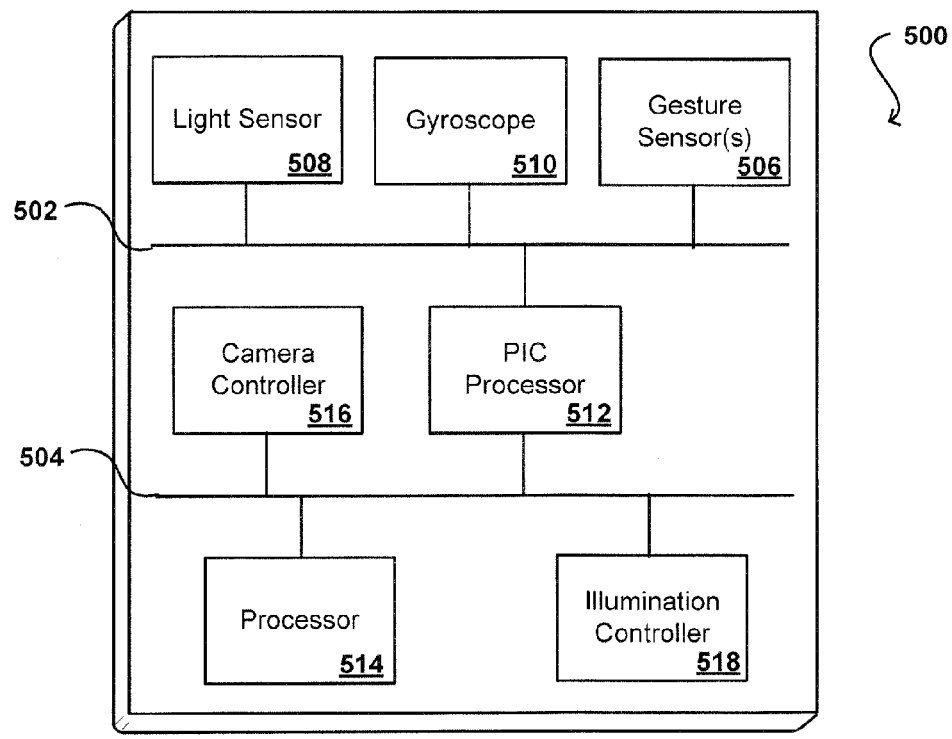
FIG. 5 illustrates a first example configuration of components of a computing device that can be used in accordance with various embodiments.

FIG. 5 illustrates an example configuration 500 of components of a computing device in accordance with at least one embodiment. In this example, one or more low power, low resolution gesture cameras 506 can capture image data. In some embodiments, a gesture camera might include one or more comparators built into the camera that can autonomously wake up one or more mode of the gesture camera and/or device, and can cause an interrupt to be sent to an appropriate processor. In some embodiments the cameras can transmit the captured image data over a low bandwidth bus 502, such as an I²C bus, to a low power microprocessor, such as a PIC-class (micro)processor 512. In other embodiments, the image data can additionally and/or alternatively be transmitted to one or more application processors and/or supervisory processors, which might be separate from a main processor of the computing device. As known for such devices, the PIC processor 512 can also communicate over the low bandwidth bus to components such as power switches (not shown), a light sensor 508, a motion sensor such as an accelerometer or gyroscope 510, and other such components. The gesture sensors can capture image data, and in response to at least a certain amount of detected variation can send the data over the low bandwidth bus 502 to the PIC processor 512, which can analyze the data to determine whether the motion or variation corresponds to a potential wake gesture, or other such input. If the PIC processor determines that the motion likely corresponds to a recognized gesture, the PIC processor can send data over a control bus 504 (e.g., a serial control bus like I²C) to a camera controller 516 to activate high resolution image capture, to an illumination controller 518 to provide illumination, or a main processor 514 (or application processor, etc.) to analyze the captured image data, among other such options. In some embodiments, the high resolution camera (not shown) might communicate with the application processor using a MIPI bus, as discussed elsewhere herein. As discussed, the use of the lower bandwidth bus can provide a significant savings in power consumption with respect to higher bandwidth buses. The lower resolution gesture sensors also produce less data, which further saves processing and storage capacity, as well as consuming less power. In at least some embodiments, one or more commands can be sent to a user interface application executing on the computing device in response to detecting a gesture represented in the image data.

In some embodiments, a gesture sensor might utilize a pair of I²C buses, one for pixel data traffic and one for command traffic. Such an implementation enables commands to be sent even when the pixel bus is tied up with pixel traffic. In another embodiment, an SD bus can be used to send pixel data while an I²C bus can be used for the command traffic.

The PIC processor can also use other information to determine how to interpret the pixel data from the gesture sensor. The PIC can receive an interrupt that causes the PIC to interrogate the I²C bus in order to obtain pixel data from the gesture sensor registers. The PIC can analyze the stored data to determine if the registers are of a class that indicates further action needs to be taken, such as to analyze data from the gesture sensor, which might include a set of images in order to obtain history or motion data. The PIC processor can also utilize information from the light sensor 508 to determine whether the device is likely in someone's pocket, and the motion detected in the image data from the gesture sensor(s) 506 is likely from the device being jostled around. If the PIC detects a potential gesture and cannot determine whether the motion corresponds to a false alert, the PIC 512 can wake up the application processor 514, which can analyze image data to detect gestures or other such information. The PIC processor can analyze the data to determine when to perform other actions as well, such as to trigger a global shutter or global reset.

In some embodiments the gesture sensors can be synchronized in order to enable tracking of objects between fields of view of the gesture sensors. In one embodiment, synchronization commands can be sent over the I²C bus, or a dedicated line can be used to join the two sensors, in order to ensure synchronization.

Figure 6:
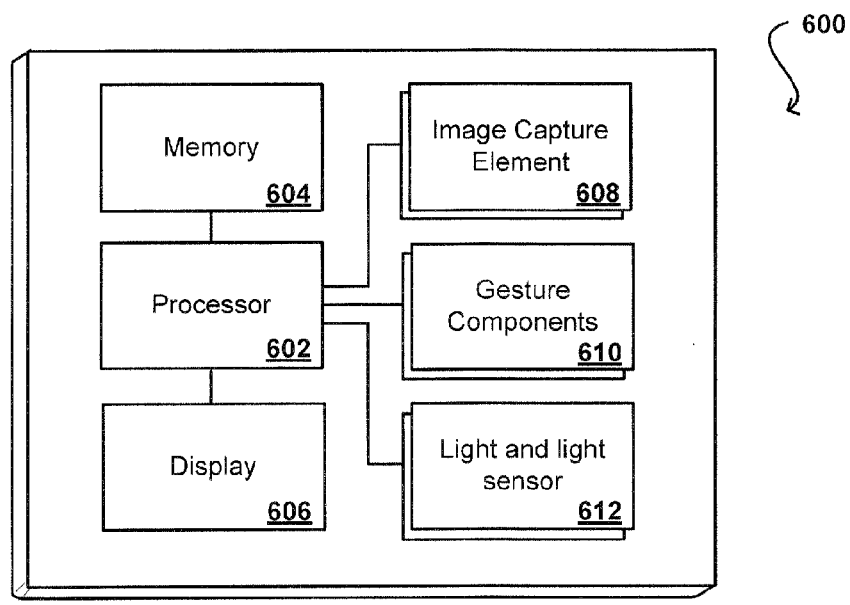
FIG. 6 illustrates a first example configuration of components of a computing device that can be used in accordance with various embodiments.

In order to provide various functionality described herein, FIG. 6 illustrates an example set of basic components of a computing device 600, such as the device 104 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include multiple image capture elements 608, such as one or more high resolution cameras that are able to image a user, people, or objects in the vicinity of the device. The device can also include at least one separate gesture sensor 610 operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. While the example computing device in FIG. 1 includes one image capture element and two gesture sensors on the "front" of the device, it should be understood that such elements could also, or alternatively, be placed on the sides, back, or corners of the device, and that there can be any appropriate number of capture elements of similar or different types for any number of purposes in the various embodiments. The device also can include at least one lighting element 612, as may include one or more illumination elements (e.g., LEDs or flashlamps) for providing illumination and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
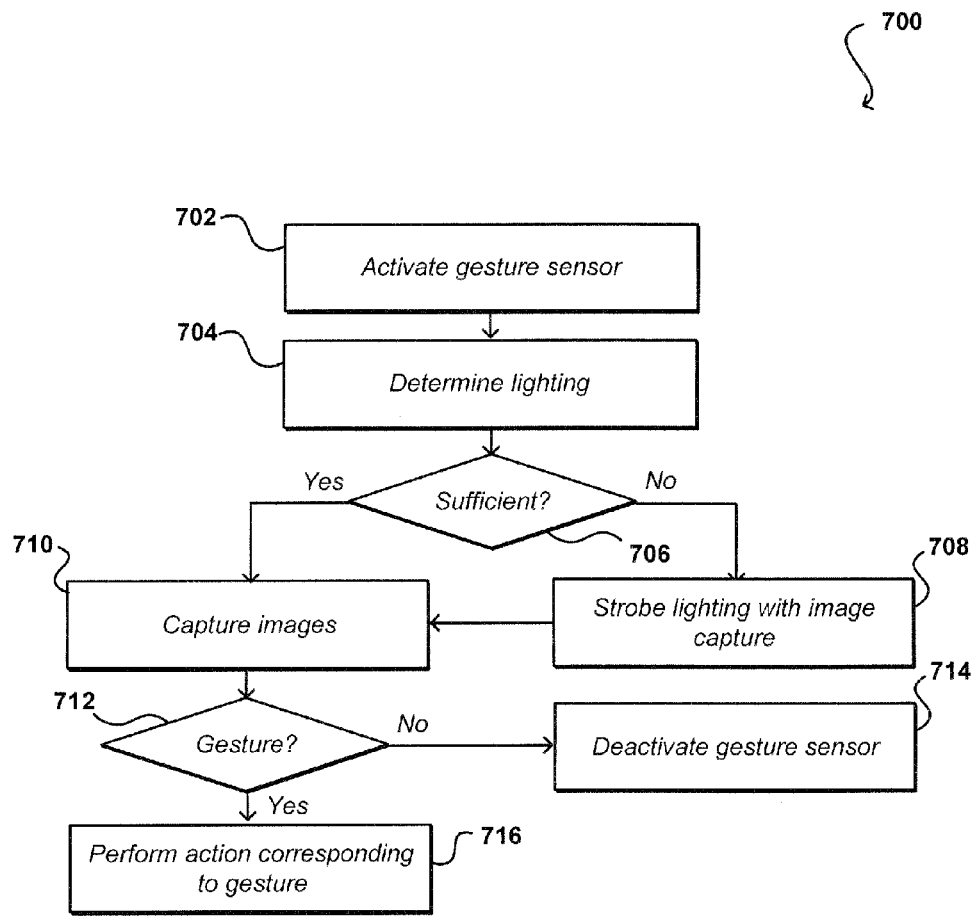
FIG. 7 illustrates an example process for enabling gesture input that can be used in accordance with various embodiments.

FIG. 7 illustrates an example process for enabling gesture input for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a gesture detection mode is activated on the computing device 702. In some embodiments, the gesture detection mode can automatically be turned on whenever the computing device is active, even in a sleep mode or other such low power state. In other embodiments, the gesture detection mode is activated automatically upon running an application or manually upon user selection. Various other activation events can be utilized as well. In at least some embodiments, the device will attempt to determine an amount of ambient lighting 704, such as by using at least one light sensor or analyzing the intensity of the light information captured by the gesture sensors using a PIC class microprocessor.

If the amount of ambient light (or light from an LCD screen, etc.) is not determined to be sufficient 706, at least one illumination element (e.g., an LED) can be triggered to strobe at times and with periods that substantially correspond with the capture times and windows of the gesture sensor 708. The commands to the illumination element in at least some embodiments are sent over an $I^2C$ bus. If the illumination element is triggered or the ambient light is determined to be sufficient, a series of images can be captured using the gesture sensor 710. The images can be analyzed using the PIC processor to determine whether the motion corresponds to a recognizable gesture 712. If not, the device can deactivate the gesture input mode and gesture sensor and/or continue to monitor for gestures in a lower power mode 714. If the motion does correspond to a gesture, an action or input corresponding to that gesture can be determined and an action performed accordingly 716. In one example, the gesture can cause a camera element of the device to be activated for a process such as facial recognition, where that camera has a similar form factor to that of the gesture sensor, but a higher resolution and various other differing aspects. In some embodiments, the image information captured by the gesture sensor is passed to a system processor for processing when the gesture sensor is in full gesture mode, with the image information being analyzed by the system processor. In such an embodiment, only the motion information is analyzed on the camera chip. Various other approaches can be used as well as discussed or suggested elsewhere herein.

Various embodiments also can control the shutter speed for various conditions. In some embodiments, the gesture sensor might have only have one effective "shutter" speed, such as may be on the order of about one millisecond in order to effectively freeze the motion in the frame. In at least some embodiments, however, the device might be able to throttle or otherwise adjust the shutter speed, such as to provide a range of exposures under various ambient light conditions. In one example, the effective shutter speed might be adjusted to 0.1 milliseconds in bright daylight to enable to the sensor to capture a quality image. As the amount of light decreases, such as when the device is taken inside, the shutter might be adjusted to around a millisecond or more. There might be a limit on the shutter speed to prevent defects in the images, such as blur due to prolonged exposure. If the shutter cannot be further extended, illumination or other approaches can be used as appropriate. In some embodiments, an auto-exposure loop can run local to the camera chip, and can adjust the shutter speed and/or trigger an LED or other such element as necessary. In cases where an LED, flashlamp, or other such element is fired to separate the foreground from the background, the shutter speed can be reduced accordingly. If there are multiple LEDs, such as one for a camera and one for a gesture sensor, each can be triggered separately as appropriate.

Figure 8:
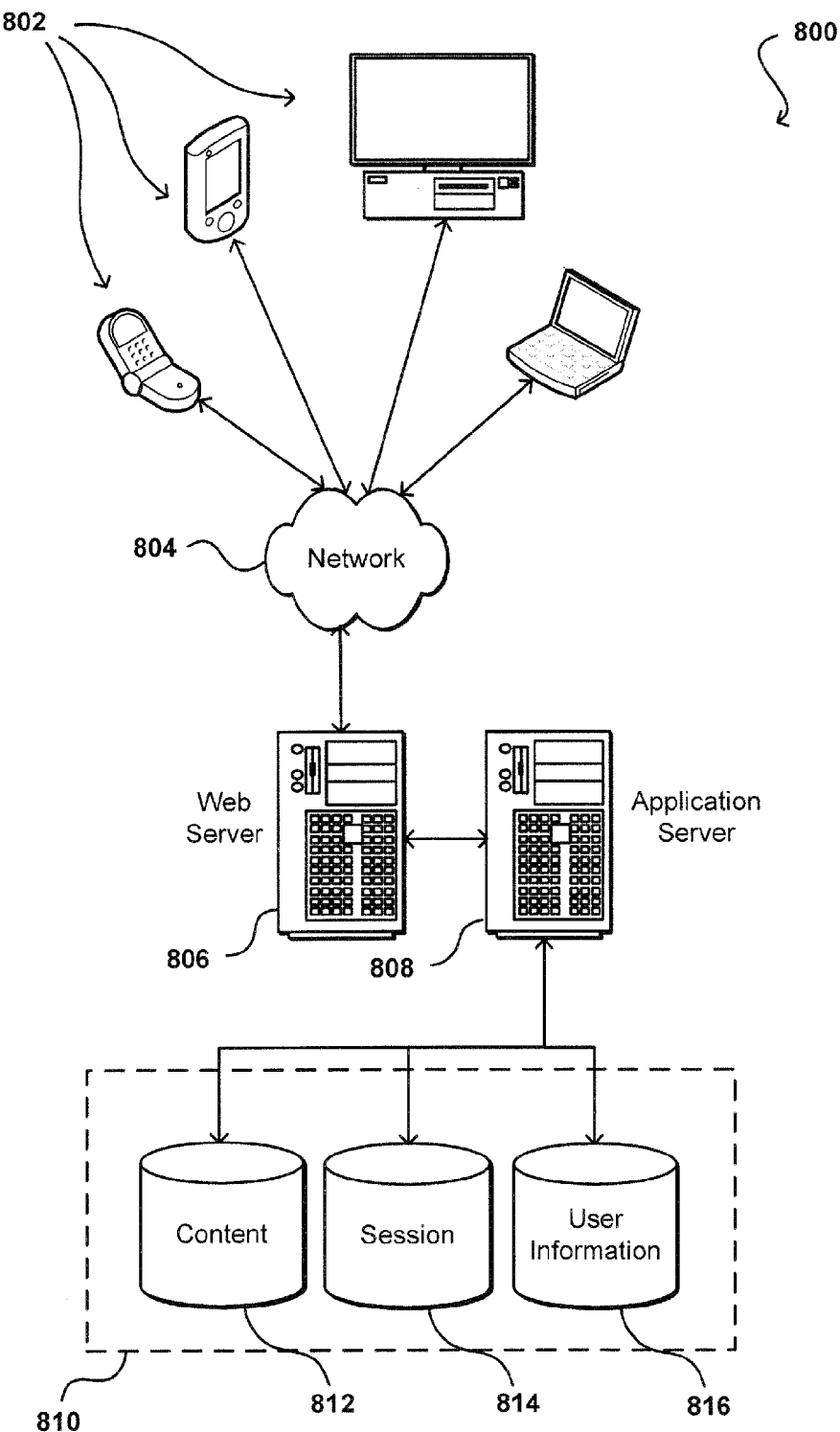
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a first camera configured to capture first image data of a first resolution associated with at least one of a sleep or low power mode;
    a second camera configured to capture second image data of a second resolution associated with a higher resolution capture mode, wherein the second resolution is higher than the first resolution;
    a processor;
    a microprocessor;
    a general purpose bi-directional serial bus having a first bandwidth and using a first amount of power for transferring the first image data from the first camera to the microprocessor, the general purpose bi-directional serial bus comprising one of an Inter-Integrated Circuit (I²C) bus, Serial Peripheral Interface (SPI) bus, or secure digital (SD) bus;
    a second bus having a second bandwidth and using a second amount of power for transferring the second image data from the second camera to the processor, wherein the second bandwidth is higher than the first bandwidth, the second amount of power is greater than the first amount of power, the second bus comprises one of a CMOS Image Sensor (CIS) bus or Mobile Industry Processor Interface (MIPI) bus;
    a first memory device including instructions operable to be executed to perform a first set of actions, enabling the microprocessor of the computing device to:
        receive, in at least one of the sleep or the low power mode, the first image data, by the microprocessor, from the first camera via the general purpose bi-directional serial bus using the first amount of power;
        analyze the first image data to detect a gesture input in the first image data at the first resolution captured by the first camera;
        send, in response to detecting the gesture input, a command to the processor to activate the second camera to capture the second image data at the second resolution;
    a second memory device including instructions operable to be executed to perform a second set of actions, enabling the processor of the computing device to:
        activate, in response to receiving the command from the microprocessor, the higher resolution capture mode to capture second image data at the second resolution using the second camera; and
        receive, by the processor, the second image data from the second camera via the second bus using the second amount of power.

2. The computing device of claim 1, wherein the microprocessor is a peripheral interface controller (PIC)-class microprocessor.

3. The computing device of claim 1, wherein the first camera has a resolution in a range of between about 256 pixels and about 76,000 pixels.

4. The computing device of claim 1, further comprising:
    at least one additional camera connected to the microprocessor over the general purpose bi-directional serial bus, data generated from one or more images captured by the at least one additional camera enabling the microprocessor to recognize gestures performed in three dimensions.

5. The computing device of claim 4, wherein the first camera and the at least one additional camera are synchronized to enable gestures to be recognized that pass between fields of view of the first camera and the at least one additional camera.

6. The computing device of claim 1, wherein the first camera operates at a frame rate within a range from about fifteen frames per second to about two-hundred and forty frames per second.

7. The computing device of claim 1, wherein the first camera is connected to the microprocessor using a pair of general purpose bi-directional serial buses, a first bus of the pair of general purpose bi-directional serial buses being used for image data and a second bus of the pair of general purpose bi-directional serial buses being used for control traffic.

8. The computing device of claim 1, wherein the instructions when executed further cause the microprocessor to operate the first camera using at least one of a global shutter or a global reset.

9. The computing device of claim 1, wherein the first memory device includes further instructions, enabling the microprocessor of the computing device to further:
    determine if an amount of ambient light is not sufficient based at least in part on an intensity of light information from the first image data captured by the first camera; and
    send, via the general purpose bi-directional serial bus, a second command to an illumination element to activate the illumination element.

10. The computing device of claim 1, wherein the first memory device includes further instructions, enabling the microprocessor of the computing device to further:
    determine an amount of ambient light based at least in part on an intensity of light information from the first image data captured by the first camera;
    adjust a shutter speed for the first camera based at least in part on the amount of ambient light; and
    capture, using the first camera, third image data at the adjusted shutter speed of the first camera.

11. The computing device of claim 10, wherein the amount of ambient light corresponds to daylight and to adjust the shutter setting comprises:
    decreasing the shutter speed of the first camera.

12. The computing device of claim 10, wherein the amount of ambient light corresponds to indoor light and to adjust the shutter setting comprises:
    increasing the shutter speed of the first camera.

13. A computer-implemented method, comprising:
- obtaining, in at least one of a sleep or power saving mode, first image data associated with a first resolution from a gesture sensor of a computing device;
- sending the first image data over a general purpose bi-directional serial bus to a first processor of the computing device, the general purpose bi-directional serial bus having a first bandwidth and using a first amount of power;
- recognizing, based at least in part on the first image data, a gesture input provided to the computing device using the first processor;
- sending, by the first processor, a command to a second processor of the computing device over a second bus having a second bandwidth and using a second amount of power in response to recognizing the gesture input, the second bandwidth being higher than the first bandwidth, the second amount of power being greater than the first amount of power;
- activating, by the second processor, a higher resolution capture mode to capture second image data at a second resolution using a camera, the second resolution being higher than the first resolution; and
- receiving, by the second processor, the second image data at the second resolution.

14. The computer-implemented method of claim 13, wherein at least a portion of the first image data is analyzed using one or more comparators of the gesture sensor to cause an interrupt to be sent to the first processor.

15. The computer-implemented method of claim 13, wherein the gesture sensor has a resolution in a range of between about 256 pixels and about 76,000 pixels.

16. The computer-implemented method of claim 13, wherein the general purpose bi-directional serial bus is one of an Inter-Integrated Circuit (I2C) bus, a Serial Peripheral Interface (SPI) bus, or a secure digital (SD) bus.

17. The computer-implemented method of claim 13, wherein the second processor is at least one of a camera controller, an application processor, or a main processor of the computing device.

18. The computer-implemented method of claim 17, wherein the first processor is a peripheral interface controller (PIC)-class microprocessor.

19. The computer-implemented method of claim 13, wherein the gesture sensor is connected to the first processor using a pair of general purpose bi-directional serial buses, a first bus of the pair of general purpose bi-directional serial buses being used for image data and a second bus of the pair of general purpose bi-directional serial buses being used for control traffic.

20. The computer-implemented method of claim 13, wherein the gesture sensor operates at a frame rate within a range from about fifteen frames per second to about two-hundred and forty frames per second.

21. The computer-implemented method of claim 13, further comprising:
- at least one additional gesture sensor connected to the first processor over the general purpose bi-directional serial bus, data generated from one or more images captured by the at least one additional gesture sensor enabling the first processor to recognize gestures performed in three dimensions.

22. The computer-implemented method of claim 21, wherein the gesture sensor and the at least one additional gesture sensor are synchronized to enable gestures to be recognized that pass between fields of view of the gesture sensor and the at least one additional gesture sensor.

23. A non-transitory computer-readable storage medium storing instructions that, when executed by a computing device, cause the computing device to:
- obtain, in at least one of a sleep or power saving mode, first image data associated with a first resolution from a gesture sensor of a computing device;
- send the first image data over a general purpose bi-directional serial bus to a first processor of the computing device, the general purpose bi-directional serial bus having a first bandwidth capability and using a first amount of power;
- recognize, based at least in part on the first image data, a gesture input provided to the computing device using the first processor;
- send, by the first processor, a command to a second processor of the computing device over a second bus having a second bandwidth capability and using a second amount of power in response to recognizing the gesture input, the second bandwidth capability being higher than the first bandwidth capability, the second amount of power being greater than the first amount of power;
- send, by the second processor, an activation command to activate a higher resolution capture mode associated with a camera of the computing device capturing second image data at a second resolution, the second resolution being higher than the first resolution of the gesture sensor; and
- receive, by the second processor, the second image data at the second resolution.

24. The non-transitory computer-readable storage medium of claim 23, wherein the first processor is a peripheral interface controller (PIC)-class microprocessor and, wherein the second processor is at least one of a camera controller, an application processor, or a main processor of the computing device.

25. The non-transitory computer-readable storage medium of claim 23, wherein the general purpose bi-directional serial bus is one of an Inter-Integrated Circuit (I2C) bus, a Serial Peripheral Interface (SPI) bus, or a secure digital (SD) bus.

26. The non-transitory computer-readable storage medium of claim 23, wherein the gesture sensor is connected to the first processor using a pair of general purpose bi-directional serial buses, a first bus of the pair of general purpose bi-directional serial buses being used for image data and a second bus of the pair of general purpose bi-directional serial buses being used for control traffic.

* * * * *